United States Patent [19]

Godfried

[11] 4,230,616
[45] Oct. 28, 1980

[54] FIRE-PROTECTING POLYESTER RESINS

[75] Inventor: Leo M. Godfried, Badhoevedorp, Netherlands

[73] Assignee: Fokker-VFW BV, Schiphol-Oost, Netherlands

[21] Appl. No.: 905,027

[22] Filed: May 11, 1978

Related U.S. Application Data

[63] Continuation of Ser. No. 303,781, Nov. 6, 1972, abandoned, which is a continuation-in-part of Ser. No. 9,987, Feb. 10, 1970, abandoned.

[30] Foreign Application Priority Data

Feb. 13, 1969 [NL] Netherlands .................. 6902243

[51] Int. Cl.$^3$ .................. C08K 5/03; C08K 5/05; C08K 5/17; C08K 3/32
[52] U.S. Cl. .................. 260/40 R; 260/45.9 NP; 260/DIG. 24; 428/431; 428/921
[58] Field of Search ..... 260/40 R, DIG. 24, 45.9 NP; 428/431, 921

[56] References Cited

U.S. PATENT DOCUMENTS

| | | | |
|---|---|---|---|
| 2,783,215 | 2/1957 | Robitschek et al. | 260/40 R X |
| 2,912,392 | 11/1959 | Stilbert et al. | 428/921 X |
| 3,449,161 | 6/1969 | Hindersinn et al. | 428/921 X |
| 3,455,869 | 7/1969 | Ernst et al. | 260/40 R |
| 3,733,289 | 5/1973 | Burns et al. | 260/45.9 NP X |
| 3,981,832 | 9/1976 | Godfried | 260/DIG. 24 |

OTHER PUBLICATIONS

H. P. Preuss, *Paint Additives,* 1970, Noyes Data Corp. (Apr., May, 1967) pp. 100–101 & 104–105.
Bikales, *Ency. of Polymer Science and Technology,* vol. 7 (1967), pp. 36–38.

*Primary Examiner*—Sandra M. Person
*Attorney, Agent, or Firm*—John P. Snyder

[57] ABSTRACT

Polyester moulding compositions and polyester resins resulting therefrom are rendered fire-protecting by incorporating in the moulding composition a combination of three materials: a source of carbon, such as e.g. pentaerythritol, a source of phosphoric acid, such as e.g. ammonium polyphosphate, and a source of non-inflammable gases such as melamine-formaldehyde, in proportions of 5–20%, 20–40% and 5–20% by weight respectively, calculated on the total weight of this combination plus polyester and monomer.

17 Claims, No Drawings

FIRE-PROTECTING POLYESTER RESINS

This is a continuation of application Ser. No. 303,781 filed Nov. 6, 1972, which is a continuation-in-part of Ser. No. 009,987 filed Feb. 10, 1970, both now abandoned.

This invention relates to polyester moulding compositions and polyester resins and more particularly to such resins and compositions that have been rendered fire-protecting in a high degree.

Polyester moulding compositions generally comprise a mixture of an unsaturated polyester with an unsaturated monomer copolymerisable therewith, to which may have been added a polymerisation catalyst, an accelerator and in many cases fillers, reinforcement fibers, colorants and other conventional additives. The combustability of such compositions and of the resins resulting therefrom is frequently reduced by adding chlorinated paraffins and/or aromatic phosphoric acid esters. For the same purpose, an amount of chlorine may be built-in chemically in the unsaturated polyester component before forming the composition.

Such special additives to moulding compositions have as a result that the resins made from the compositions by moulding and curing are more or less self-extinguishing or flame-resistant when exposed to fire. Nevertheless, and in view of many utilisations, there is a constant need for polyester moulding compositions and polyester resins that have improved fire-protecting characteristics.

In accordance with the invention, it has now been found that polyester resins may be rendered fire-protecting in a high degree by incorporating in their moulding compositions a combustion of three materials that may be indicated as a source of carbon, a source of phosphoric acid and a source of non-inflammable gases. When the resins made from such compositions are exposed to high temperatures or even to an open fire they will superficially give rise to the production of bubbles and foam, thus resulting in a multicellular foam layer at their surface and such a foam layer will insulate the underlying portions of the resins from combustion.

An object of the invention is to provide a polyester moulding composition, essentially comprising an unsaturated polyester and an unsaturated monomer copolymerisable therewith, together with a source of carbon, a source of phosphoric acid and a source of non-inflammable gases in proportions suitable for rendering the composition fire-protecting in a high degree.

A further object of the invention is to provide fire-protecting polyester resins obtainable from such a moulding composition by moulding and curing and essentially comprising a cured copolymerisation product of an unsaturated polyester and an unsaturated monomer copolymerisable therewith, said polyester resins having a source of carbon, a source of phosphoric acid and a source of non-inflammable gases incorporated therein throughout their mass in proportions suitable for rendering the resins fire-protecting in a high degree.

A combination of the three aforesaid materials has been used already earlier in paints (so-called intumescent coatings) but the use thereof in polyester moulding compositions and consequently the use thereof throughout the mass of moulded polyester resins has never been proposed before.

In the moulding compositions of the invention, any combination of unsaturated polyester and unsaturated copolymerisable monomer may be used, that is conventional in the art. The presence of a certain amount of chlorine in the polyester component, e.g. chemically built-in chlorine, is not objectionable and may even be advantageous. Typical examples of the polyester component are chlorendic acid-based polyesters and low-viscosity polyesters, Chlorendic acid-based polyesters are preferred because of their high chlorine content. A typical example of an unsaturated monomer copolymerisable therewith is styrene but other conventional monomers may also be used wherever suitable. In most cases, the monomer will also serve as a diluent.

Any conventional type of polymerisation catalyst and accelerator may be used to cure the moulded polyester resin. Typical examples of the catalyst are organic peroxides and hydroperoxides and typical examples of the accelerator are organo-metallic compounds. The preferred compounds are methyl ethyl ketone peroxide and cobalt octoate and their proportions will generally be from 1 to 5% and from 0.5 tot 3% by weight, respectively, calculated on the combination of polyester and monomer.

Moreover, any conventional type of fillers, reinforcement fibers, colorants and other additives suitable for the intended use of the desired end product may be added to the polyester-monomer combination. Further, a special diluent, like acetone, methyl ethyl ketone or toluene may sometimes be added to improve workability or of the resulting moulding composition.

Suitable fire-protecting characteristics are given to the product by incorporating in the moulding composition a combination of three materials, viz. a source of carbon, a source of phosphoric acid and a source of non-inflammable gases.

The carbon source to be used is generally a material containing many radicals capable of entering into an esterifying reaction with phosphoric acid, said material having a high carbon content and a high temperature of decomposition. Its decomposition temperature should at least be higher than that of the phosphoric acid source. Typical examples of the carbon source are starch, casein, and polyvalent alcohols such as pentaerythritol. Mixtures of mono- and di-pentaerythritol are preferred because they are easily available and have a high amount of esterifiable radicals.

The phosphoric acid source may be any material that has a decomposition temperature lower than that of the carbon source and that will generate phosphoric acid at such temperature, the phosphoric acid as generated then being capable of forming esters with radicals derived from the carbon source. Typical examples are ammonium orthophosphate and polyphosphoryl phosphate. The preferred phosphoric acid source is a commercially available ammonium polyphosphate which comprises more phosphoric acid than other similar materials and which is moreover water-insoluble, so as to give a good weather-resistance to the end product.

The source of non-inflammable gases or blowing agent may be a mixture of two or more substances having different decomposition temperatures, viz. at least one substance of relatively low decomposition temperature and at least one substance of relatively high decomposition temperature. Typical examles of the substance of low decomposition temperature are amines and amides, such as e.g. dicyanodiamide, urea, melamine, guanidine and preferably, melamine-formaldehyde.

Typical examples of the substance of relatively high decomposition temperature are chlorinated aromatics such as e.g. chlorinated naphthalene. These chlorinated aromatics may be used together with antimony trichloride and react therewith to form antimony monochlorides which give special fire-retarding characteristics to the moulding composition. On the other hand, the chlorinated aromatics may be omitted partially or completely if chlorine has already been built-in chemically in the polyester component.

The concentrations of the several fire-protecting materials in the invented polyester moulding compositions, as well as their mutual ratios are bound to certain limits in order to satisfy the requirements of high fire-protection on one hand and economic production on the other hand. Thus, if the polyester component and monomer are present in proportions of 35 to 50% by weight (preferably about 38% by weight) and 5 to 10% by weight (preferably about 8% by weight) respectively, the carbon source should generally be added in proportions of 5 to 20% by weight and preferably about 14% by weight, calculated on the combined weight of polyester and monomer and fire-protecting additives. The phosphoric acid source should generally be added in proportions of 20 to 40% by weight and preferably about 22% by weight on the same basis, and the source of non-inflammable gases should generally be added in proportions of 5 to 20% by weight and preferably about 18% by weight, on the same basis. These proportions will ensure an effective combination of fire-protecting ingredients dispersed throughout the whole mass of the moulding composition and will render the end product fire-protecting in a high degree.

In the case that the source of non-inflammable gases comprises a mixture of amine or amide together with a chlorinated aromatic, the amine or amide will be used in a proportion of 5 to 20% by weight and preferably about 18% by weight, and the chlorinated aromatic will be used in proportions of 0 to 10% and preferably about 7%, calculated on the combined weight of polyester and monomer and fire-protecting additives. The proportion of polyester component may be reduced accordingly then from an initial value of 35 to 50% by weight to a reduced value of 25 to 40% by weight. An addition of antimony trichloride is generally used in a proportion of 0 to 5% and preferably about 0.2% by weight, on the same basis as above.

The time and sequence of adding the several fire-protecting and other additives to the components of the polyester moulding composition are not critical although it is preferred to incorporate the carbon source, the phosphoric acid source and the source of non-inflammable gases prior to admixing the catalyst and accelerator thereto. In special cases, such as cold-setting polyester resins, where the catalyst is active already at room temperature, a non-catalysed composition may be made first for storage and shipping, and the required catalyst and accelerator may be added in a later stage just prior to moulding and curing.

After forming the polyester moulding composition, this composition may be introduced into a specific mould of appropriate size and dimensions and it may be cured therein in a conventional way to form massive or hollow articles. The fire-protecting additives are integrated completely then in and throughout the mass of polyester resin constituting such articles.

As an alternative to the above moulding method, the moulding composition may be laminated with one or more layers of glass fiber reinforcements and cured to form a fire-protecting polyester resin-glass fiber laminate.

Another possibility is to form sandwichpanels having a core of foam plastic or honeycomb material or another suitable core material and skin sheets of fire-protecting glass-fiber-reinforced polyester resin made from the invented polyester moulding composition. In that case, it will be advantageous to impregnate glass fibers with an invented moulding composition in which the catalyst is only operative ate elevated temperatures, then to apply the resulting sheets of impregnated glass fibers to a core material and thereafter introducing the whole combination into a mold and curing it by means of heat and pressure.

The polyester resins and articles produced from the invented polyester moulding compositions are suitably protected against fire and other ways of excessive heating, thanks to the combination of three materials incorporated therein throughout their mass. Although the invention is not to be restricted by any theoretical explanation of the fire-protecting effect, it is assumed that the phosphoric acid source will decompose first during excessive heating and will liberate phosphoric acid which reacts immediately with the carbon source to form a rather complex ester. Thereupon, the ester will decompose and form a big volume of carbon, additional water, carbon dioxide and non-inflammable gases. Moreover, phosphoric acid is recovered and this may enter again into an esterifying reaction with the carbon source. Simultaneously with the ester, the gas-forming materials will decompose and will liberate big volumes of non-inflammable gases. The result is a bubbling and boiling mass which develops a multicellular foam, said foam forming a thick insulating layer and protecting the underlying portions against further attack.

The invention is of great advantage to polyester resin articles that should satisfy high standards of security, e.g. aircraft parts, automobile parts, housing walls and plant walls.

EXAMPLE 1

A mixture is made from 415 grams of unsaturated chlorendic-acid-based polyester (Crystic 301 of Scott Bader & Co. England), 55 grams of styrene, 90 grams of toluene, 13 grams of talcum powder (thixotropic agent), 52 grams of dipentaerytritol, 288 grams of ammonium polyphosphate (Phos-Check P 30 of Monsanto), 74 grams of melamine and 13 grams of Chlorowax 70 or Cerechlor 70 (Trade Marks of chlorinated naphthalene. The resulting non-catalysed polyester composition (1000 grams) is a viscous opalescent product having an acid number of at most 32 and being stable for at least 6 months at room temperature (20° C.).

The composition is completed for moulding by mixing 100 parts by weight of it with 4 parts by weight of methyl ethyl ketone peroxide catalyst (50%) and with at most 2 parts by weight of cobalt octoate accelerator (1% cobalt in styrene). In a first experiment, the catalyst and accelerator are added in combination to the whole composition, thus resulting in a moulding composition having a pot life of 20 to 30 minutes at room temperature for at most 500 grams. In another experiment, the catalyst and accelerator are each added to 50 parts by weight of the aforesaid composition and only brought together afterwards. In that case, the resulting composition has a pot life of 8 hours at room temperature for 100 kilograms.

The moulding compositions of both experiments are laminated with one or more layers of glass fiber reinforcement in such a way that the resulting laminates have a resin layer of at most 400 g/m$^2$ at one side, and thereupon the laminates are left to cure. After 4 hours at room temperature, the layer of polyester resin is free of tackiness in both cases although the curing operation will last for at least 2×24 hours.

If one side of the resulting laminate is exposed to an open fire or to heat radiation sources having temperatures up to 1400° C., it will spontaneously form a non-inflammable foam layer which isolates the remainder of the laminate against decomposition and combustion. The foaming surface is uniform and closed. The resulting foam mass is homogeneous.

EXAMPLE 2

If the same way as in Example 1, a non-catalysed polyester composition is made.

To this composition is added 1–3% by weight of benzoylperoxide catalyst. The resulting mixture is applied to a glass fiber mat (30% or more by weight of the composition) and caused to impregnate that mat by rolling. The impregnated mat is stored as a semi-finished article and may afterwards be converted to a finished article such as a sandwich panel by applying it in the form of skin sheets to a core material, introducing the combination into a mould and curing it by heat and pressure. The resulting finished article has similar fire-protecting characteristics as the laminate described in Example 1.

EXAMPLE 3

A mixture is made from 54 grams of chlorendic acid-based polyester (Crystic 301 of Scott Bader & Co. England), 306 grams of low-viscosity orthophthalic-acid-based polyester (Crystic 405 NT of Scott Bader & Co.), 80 grams of styrene, 133 grams of pentaerythritol (a commercial mixture of mono- and di-pentaerythritols), 208 grams of ammonium polyphosphate (Phos-Check P 30 of Monsanto), 170 grams of melamine-formaldehyde (Beetle BE-27 of B.I.P.-Chemicals), and 2 grams of antimony trioxide. The resulting non-catalysed and non-diluted polyester composition (1000 grams) is a viscous opalescent product having an acid number of about 7.2 and being stable for at least 6 hours at room temperature (20° C.)

The composition is completed for moulding by mixing 100 parts by weight of it with 15 parts by weight of methyl ethyl ketone (diluent), 4 parts by weight of methyl ethyl ketone peroxide catalyst (50%) and 2 parts by weight of cobalt octoate accelerator (1% solution in styrene). When the catalyst is mixed in as a last component, then the composition has a pot life of about 16 minutes at room temperature.

The moulding composition is laminated with layers of glass fiber reinforcements in the way of example 1. The curing operation will last for at least 72 hours.

If one side of the resulting laminate is exposed to open fire or to heat radiation sources having temperatures above 1400° C., it will spontaneously form a non-inflammable foam layer, which insulates the remainder of the laminate against decomposition and combustion. The foam surface is uniform and closed and no separation from the remainder of the resin takes place. Moreover, this resin has a better weather-resistance and ageing resistance than the products of examples 1 and 2.

EXAMPLE 4

A mixture is made from 298 grams of low-viscosity orthophthalic acid-based polyester (Crystic 405 NT of Scott Bader & Co. England) 80 grams of styrene, 133 grams of pentaerythritol (a commercial mixture of mono- and di-pentaerythritols), 208 grams of ammonium polyphosphate (Phos-Check P 30 of Monsanto), 170 grams of melamineformaldehyde (Beetle BE-27 of B.I.P. Chemicals), 2 grams of antimony trioxide and 62 grams of chlorinated naphthalene (Cereclor 70 of Imperial Chemical Industries). The resulting non-catalysed and non-diluted polyester composition (1000 grams) is a viscous opalescent product having similar properties as the product of example 3.

The composition is completed for moulding in the way of Example 3 and thereafter laminated with layers of glass fiber reinforcements and cured in the same way as described above. The resulting end product has similar fire-protecting characteristics as the laminate described in example 3.

What I claim:

1. In a fire-protecting moulding composition, the combination of:
   35 to 50% by weight of an unsaturated polyester and 5 to 10% by weight of an unsaturated monomer copolymerisable therewith, together with a mixture of fire-protecting additives to render the moulding composition, when set, intumescent, said mixture consisting of:
   5 to 20% by weight of a source of carbon having a high temperature of decomposition and containing many radicals capable of entering into an esterifying reaction with phosphoric acid,
   20 to 40% by weight of a source of phosphoric acid having a decomposition temperature lower than that of said source of carbon whereby said esterifying reaction may take place at said decomposition temperature, and
   5 to 20% by weight of a source of non-inflammable gases, said source providing said gases at temperatures above the decomposition tempera of said phosphoric acid source, all percentages being calculated on the combined weight of polyester and monomer fire-protecting additives.

2. A moulding composition comprising about 30% by weight of unsaturated polyester and about 8% by weight of unsaturated monomer is combined with a mixture of about 14% by weight of a source of carbon, about 22% by weight of a source of phosphoric acid, and about 18% by weight of a source of non-inflammable gases.

3. The moulding composition as claimed in claim 1, wherein the carbon source is selected from the group consisting of mono- and di-pentaerythritol and mixtures thereof.

4. The moulding composition as claimed in claim 1, wherein the phosphoric acid source is selected from the group consisting of ammonium orthophosphate, polyphosphoryl phosphate and preferably ammonium polyphosphate.

5. The moulding composition as claimed in claim 1, wherein the source of non-inflammable gases comprises at least two substances having different decomposition temperatures, viz. at least one substance of relatively low decomposition temperature and at least one substance of relatively high decomposition temperature.

6. The moulding composition as claimed in claim 5, wherein the substance of relatively low decomposition temperature is selected from the group consisting of dicyanodiamide, urea, melamine, guanidine, melamine-formaldehyde and other amines and amides.

7. The moulding composition as claimed in claim 5, wherein the substance of relatively high decomposition temperature is selected from the group consisting of chlorinated naphthalene and other chlorinated aromatics.

8. A moulding composition comprising 25 to 40% by weight of chlorendic acid-based polyester and 5 to 10% by weight of unsaturated monomer are combined with five to twenty percent of carbon source 20 to 40% by weight of a source of phosphoric acid. 5 to 20% by weight of a substance selected from the group consisting of amines and amides, and 0–10% by weight of chlorinated aromatics.

9. A molded, polyester resin article essentially comprising: a molded and cured copolymerisation product of 35 to 50% by weight of an unsaturated polyester and 5 to 10% by weight of an unsaturated monomer copolymerisable therewith, said polyester resin article containing a mixture of fire-protecting additives to render the cured product intumescent, said mixture consisting of 5 to 20% by weight of a source of carbon having a high temperature of decomposition and containing many radicals capable of entering into an esterifying reaction with phosphoric acid, 20 to 40% by weight of a source of phosphoric acid having a decomposition temperature lower than that of said source of carbon whereby said esterifying reaction may take place at said decomposition temperature, and 5 to 20% by weight of a source of non-inflammable gases, said source providing said gases at temperatures above the decomposition temperature of said phosphoric acid source, all percentages being calculated on the combined weight of polyester and monomer and fire-protecting additives.

10. A molded, polyester resin article comprising about 30% by weight of unsaturated polyester and about 8% by weight of unsaturated monomer which is combined with a mixture of about 14% by weight of a source of carbon, about 22% by weight of a source of phosphoric acid, and about 18% by weight of a source of non-inflammable gases.

11. The molded, polyester resin article as claimed in claim 9, wherein the carbon source is selected from the group consisting of mono- and di-pentaerythritol and mixtures thereof.

12. The molded, polyester resin article as claimed in claim 9, wherein the phosphoric acid source is selected from the group consisting of ammonium orthophosphate, polyphosphoryl phosphate and preferably ammonium polyphosphate.

13. The molded, polyester resin article as claimed in claim 9, wherein the source of non-inflammable gases comprises at least two substances having different decomposition temperatures, viz. at least one substance of relatively low decomposition temperature and at least one substance of relatively high decomposition temperature.

14. The molded, polyester resin article as claimed in claim 13, wherein the substance of relatively low decomposition temperature is selected from the group consisting of dicyanodiamide, urea, melamine, guanidine, melamine-formaldehyde and other amines and amides.

15. The molded, polyester resin article as claimed in claim 13, wherein the substance of relatively high decomposition temperature is selected from the group consisting of chlorinated naphthalene and other chlorinated aromatics.

16. A molded, polyester resin article comprising 25 to 40% by weight of chlorendic acid-based polyester and 5 to 10% by weight of unsaturated monomer which are combined with five to twenty percent of carbon source, 20 to 40% by weight of a source of phosphoric acid, 5 to 20% by weight of a substance selected from the group consisting of amines and amides and 0 to 10% by weight of chlorinated aromatics.

17. The molded, polyester resin article as claimed in claim 9, further comprising a glass fiber reinforcement.

* * * * *